United States Patent
Swaminathan

(10) Patent No.: US 8,879,556 B2
(45) Date of Patent: Nov. 4, 2014

(54) MANAGING A HOME NETWORK

(75) Inventor: Kailash Swaminathan, Bangalore (IN)

(73) Assignee: Koninklijke Philips N.V., Eindhoven (NL)

( * ) Notice: Subject to any disclaimer, the term of this patent is extended or adjusted under 35 U.S.C. 154(b) by 619 days.

(21) Appl. No.: 13/147,381

(22) PCT Filed: Jan. 27, 2010

(86) PCT No.: PCT/IB2010/050347
§ 371 (c)(1),
(2), (4) Date: Aug. 3, 2011

(87) PCT Pub. No.: WO2010/089677
PCT Pub. Date: Aug. 12, 2010

(65) Prior Publication Data
US 2011/0289365 A1  Nov. 24, 2011

(30) Foreign Application Priority Data

Feb. 5, 2009  (EP) .................................... 09152129

(51) Int. Cl.
| H04L 29/06 | (2006.01) |
| H04W 12/08 | (2009.01) |
| H04L 12/28 | (2006.01) |
| H04W 88/16 | (2009.01) |
| H04L 29/12 | (2006.01) |
| H04W 84/10 | (2009.01) |

(52) U.S. Cl.
CPC .......... *H04L 63/0236* (2013.01); *H04L 12/2809* (2013.01); *H04L 12/2834* (2013.01); *H04W 88/16* (2013.01); *H04L 61/103* (2013.01); *H04L 29/12028* (2013.01); *H04W 84/10* (2013.01); *H04W 12/08* (2013.01)
USPC ........................................... 370/392; 370/475

(58) Field of Classification Search
CPC .................................................... H04L 61/103
USPC ................................................. 370/392, 475
See application file for complete search history.

(56) References Cited

U.S. PATENT DOCUMENTS

| 2005/0054326 | A1 | 3/2005 | Rogers | |
| 2008/0250123 | A1* | 10/2008 | Chae et al. | 709/220 |
| 2008/0313729 | A1* | 12/2008 | Foschiano et al. | 726/12 |

FOREIGN PATENT DOCUMENTS

WO   WO2007030812 A2   3/2007

\* cited by examiner

*Primary Examiner* — Melvin Marcelo
(74) *Attorney, Agent, or Firm* — Larry Liberchuk

(57) ABSTRACT

A method for detecting an error in a home network while a network-compatible device is newly added to the home network, the home network having a modem configured to be connected to the Internet, a home gateway connected between the modem and the home network, the method for detecting the error comprising employing address resolution protocol and detecting the error in the home network due to filtering based on MAC addresses is disclosed. The disclosed subject matter can be used for diagnosis of problems in the home network that can arise due to filtering based on Media Access Control addresses by the home gateway.

18 Claims, 3 Drawing Sheets

MANAGING A HOME NETWORK

FIELD OF THE INVENTION

The subject matter relates to home networks and more specifically to managing home networks while a network-compatible device is newly added to the home network.

BACKGROUND OF THE INVENTION

US20050021786 discloses an apparatus and method capable of efficiently and accurately constructing an access control configuration having high security. Only the MAC address of a controller (client) authorized by a user is authenticated and registered in a MAC address table of a device and the device performs MAC address filtering for permitting access by the controller (client) which is authenticated and registered in the MAC address table. This can pose problems when a network-compatible device is newly added to the home network.

SUMMARY OF THE INVENTION

It is an object of the present subject matter to assist users in managing home networks while a network-compatible device is newly added to the home network.

The object of the present subject matter is realized by providing a method for detecting an error in a home network while a network-compatible device is newly added to the home network, the home network having a modem configured to be connected to the Internet, a home gateway connected between the modem and the home network, the method for detecting the error comprising employing address resolution protocol and detecting the error in the home network due to filtering based on MAC addresses.

Filtering based on MAC addresses prevents unauthorized access of the home network. Generally, a newly added network-compatible device to the home network can be prevented from having full connectivity. This can result in an error in the home network and the newly added network-compatible device can be non-operational. The customer generally does not know the MAC address filtering feature in the home network. Hence the customer may draw incorrect conclusions about the newly added network-compatible device. The disclosed method can assist the customer in managing the home network by detecting the error in the home network.

Address Resolution Protocol is generally used to translate IP addresses to Ethernet MAC addresses whereas in the disclosed method Address Resolution Protocol is used for detection of filtering based on MAC addresses. Based on the outcome of the detection appropriate corrective action can be taken to enable proper operation of the newly added network-compatible device.

In an embodiment, employing the address resolution protocol and detecting the error in the home network comprises
  finding the IP address of the home gateway;
  employing the host computer in the home network and using i) the MAC address of the host computer as the sender MAC address ii) a first IP address as the sender IP address of the host computer and initiating an address resolution protocol request and requesting the MAC address associated with the IP address of the home gateway;
  modifying in a pre-determined manner the received MAC address of the home gateway and generating a new MAC address;
  employing the host computer in the home network and using i) the new MAC address as the sender MAC address ii) a second IP address that is different from the first IP address as the sender IP address of the host computer and initiating an address resolution protocol request and requesting the MAC address associated with a target IP address of the newly added network-compatible device; and
  detecting the error in the home network based on the address resolution protocol reply.

This embodiment can detect the errors in the home network that arise due to filtering based on MAC address by the home gateway. The detection method is simple, makes use of Address Resolution Protocol which is available in the home network and requires minimal interaction.

The second IP address can be obtained using known methods. As an illustrative example, the second IP address can be obtained by
  i. sending an address resolution protocol message with target IP address ranging from the first to the last IP address (excluding the broadcast subnet IP address) in the subnet and
  ii. finding out an IP address for which there are no address resolution protocol reply.

As a further illustrative example, the second IP address can be obtained by sending out a Dynamic Host Configuration Protocol (DHCP) request and receiving an unallocated IP address from the DHCP server. As a still further illustrative example, an IP address in the auto-IP address range can be used after checking (e.g. using address resolution protocol message) that IP address does not exist within the subnet.

In a further embodiment, modifying in a pre-determined manner the received MAC address of the home gateway comprises
  incrementing or decrementing by a pre-determined constant value the least significant byte of the received MAC address.

This embodiment can be used to generate a new MAC address whose probability of being the MAC address of another network-compatible device in the home network is approximately close to zero. The modified MAC address can aid in detection of errors due to filtering based on MAC addresses.

In a still further embodiment, detecting the error in the home network based on the address resolution protocol reply comprises
  verifying that there is no response for the address resolution protocol request; and
  notifying that filtering based on MAC addresses is enabled in the home network.

This embodiment has the advantage that based on the address resolution protocol reply it is possible to infer that filtering based on MAC addresses is enabled in the home network.

In a still further embodiment, the method comprises
  generating a new MAC address to be associated with the newly added network-compatible device and registering the new generated MAC address into the MAC address allow list of the home gateway to enable proper functioning of the newly added network-compatible device. This embodiment has the advantage that appropriate corrective action can be taken to enable proper functioning of the newly added network-compatible device. This can increase customer satisfaction.

In a still further embodiment, the method comprises
  verifying that there is a response for the address resolution protocol request. This can aid in confirming that filtering based on MAC addresses is disabled.

In a still further embodiment, the method comprises
  checking whether the newly added network-compatible device is non-functional and if so initiating a customer service request to report non-functioning of the newly added network-compatible device and providing information to the customer service center that filtering based on MAC addresses is disabled in the home network.

This embodiment helps in taking appropriate corrective action. Further it provides useful information to the customer support center. The information can help in fixing the error and enabling proper functioning of the newly added network-compatible device. This can also help in speedy closure of customer support calls. This can also be of help in understanding the source of the error thereby reducing the risk of drawing incorrect conclusions e.g. the customer may conclude that there is an error with the newly purchased network-compatible device even though the source of the error is in the home gateway.

The object of the present invention is further realized by providing a detection unit for detecting an error in a home network while a network-compatible device is added to the home network, the home network having a modem configured to be connected to the Internet, a home gateway connected between the modem and the home network, the detection unit comprising means configured to employ address resolution protocol and detect the error in the home network due to filtering based on MAC addresses.

The object of the present subject matter is still further realized by providing a software program for detecting an error in a home network while a network-compatible device is newly added to the home network, the home network having a modem configured to be connected to the Internet, a home gateway connected between the modem and the home network, the software program comprising program code means configured to employ address resolution protocol and detect the error in the home network due to filtering based on MAC addresses.

BRIEF DESCRIPTION OF THE DRAWINGS

The above-mentioned aspects, features and advantages will be further described, by way of example only, with reference to the accompanying drawings, in which the same reference numerals indicate identical or similar parts, and in which.

DETAILED DESCRIPTION OF THE EMBODIMENTS

Figure 1:
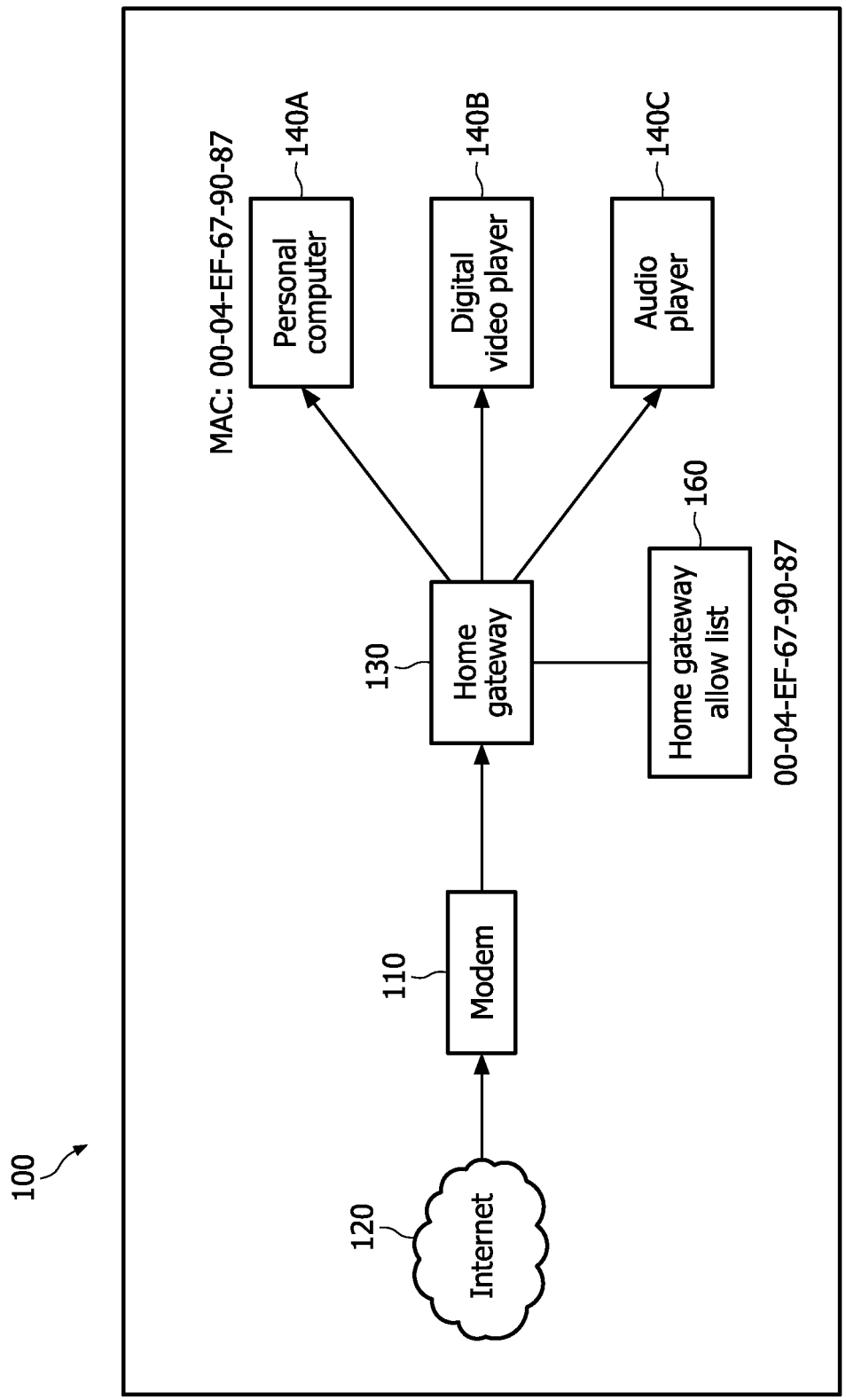
FIG. 1 shows an exemplary configuration of a home network according to an embodiment of the present subject matter.

Referring now to FIG. 1, the home network 100 is a residential local area network. The home network 100 is used to connect a plurality of network-compatible devices 140A, 140B, 140C within the home environment. The home network 100 comprises i. a modem 110 configured to be connected to the Internet 120 ii. a home gateway 130 connected between the modem 110 and a plurality of network-compatible devices 140A, 140B, and 140C. The network-compatible device can be a personal computer or entertainment peripheral such as a digital video player, digital audio player, game machines and stereo system.

The home gateway 130 is generally provided with a MAC address filtering feature. The network-compatible devices 140A, 140B and 140C that are able to connect to the Internet using the home gateway can be restricted based on MAC addresses. This can prevent unauthorized access to the home network. In operation, the Internet connectivity to 140A (i.e. the personal computer) works fine as its MAC address (e.g. 00-04-EF-67-90-87) is included in the allow list of MAC addresses in the home gateway. Hence, 140A (i.e. the personal computer) is granted access.

Figure 2:
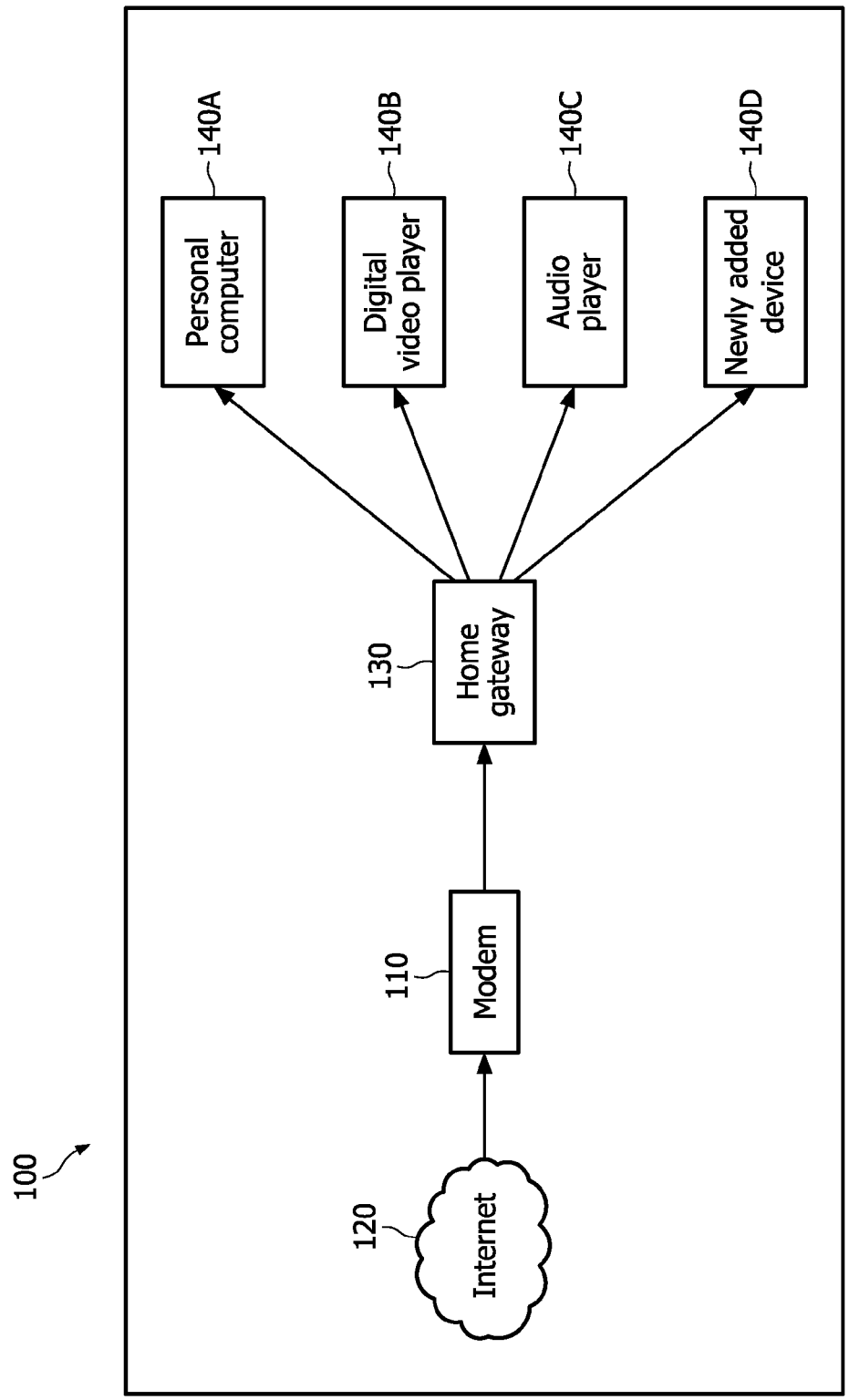
FIG. 2 shows an exemplary configuration of a home network when a network-compatible device is newly added to the home network.

Referring now to FIG. 2, the user adds a new network-compatible device 140D to the home network 100. When the user connects the new network-compatible device 140D to the home network, the network-compatible device 140D may not have proper connectivity to the Internet. The newly added network-compatible device 140D can give rise to errors in the home network and can be non-functional. The reason being that the MAC address of the new network-compatible device 140D may not be included in the allow list of MAC addresses in the home gateway. The customer may not be able to detect the source of the error and fix the error.

Figure 3:
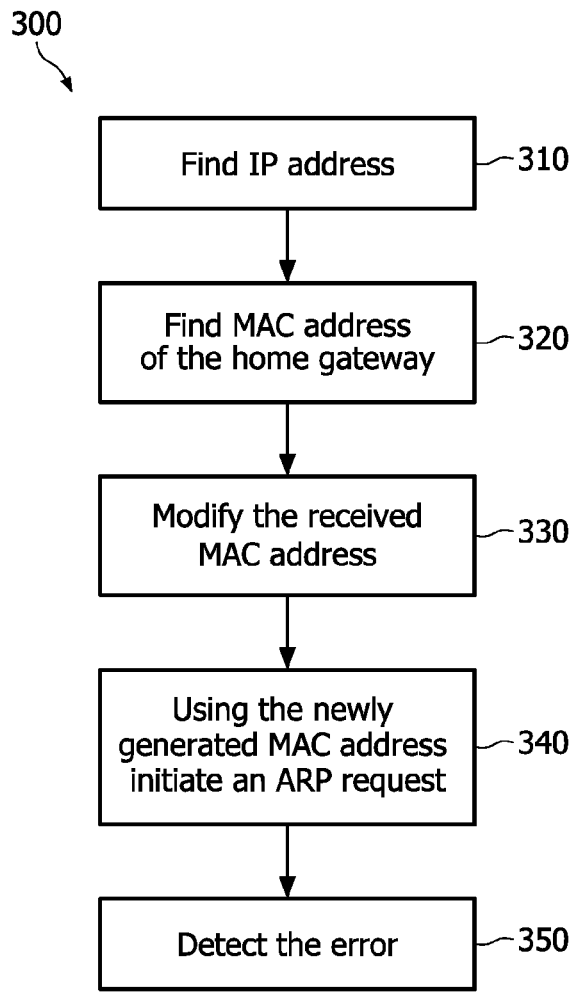
FIG. 3 schematically shows an exemplary flow chart illustrating the method of detecting an error in the home network while the network-compatible device is newly added to the home network.

Referring now to FIG. 3, the disclosed method for detecting the error in the home network based on filtering of MAC addresses uses the standard Address Resolution Protocol (ARP).

Address Resolution Protocol is generally used to translate IP addresses to Ethernet MAC addresses whereas in the disclosed method Address Resolution Protocol is used for detection of filtering based on MAC addresses. Based on the outcome of the detection appropriate corrective action can be taken to enable the newly added network-compatible device to be operational.

The disclosed method can be implemented as a software program (i.e. for diagnostic purposes) that can be executed on the personal computer connected to the home network. The software program can be provided in the network-compatible device or it can be downloaded from a web site.

The software can be run on the personal computer to detect the error in the home network. The method of detecting the error comprises a step 310 of finding the IP address of the home gateway. The IP address of the home gateway can be found using known mechanisms. As an illustrative example, the IP address of the home gateway can be 192.168.1.1.

In step 320, using the personal computer and the MAC address (00-04-EF-67-90-87) of the personal computer as the sender MAC address and the first IP address (192.168.1.100) of the personal computer as the sender IP address, an Address Resolution Protocol request is initiated requesting the MAC address associated with the IP address (i.e. 192.168.1.1) of the home gateway.

The MAC address of the personal computer is already available in the allow list of the home gateway. Hence, an Address Resolution Protocol reply message can be received from the home gateway informing its own MAC address (e.g. 00-01-FE-78-09-67) as the requested IP address (i.e. 192.168.1.1) was that of the home gateway.

In step 330, the MAC address (00-01-FE-78-09-67) of the home gateway is modified in a pre-determined manner to generate a new MAC address (e.g. 00-08-AB-CD-EF-64).

Alternately, it is possible to modify the MAC address of the host computer. The idea here is to get a new MAC address and hence any registered MAC address in the home network can be used. One way of modifying the MAC address of the home gateway in a pre-determined manner can be decrementing the least significant byte of the MAC address by a constant value. As an illustrative example, by decrementing the MAC address of the home gateway by a predetermined constant (e.g. 3) the new MAC address would be 00-01-FE-78-09-64. This can generate a new MAC address whose probability of being the MAC address of another network-compatible device in the home network is almost close to zero. The new MAC address can aid in detection of filtering based on MAC address.

In step 340, using the personal computer and the new generated MAC address (i.e. 00-08-AB-CD-EF-64) as the sender MAC address and a different IP address (e.g. 192.168.1.72) as the sender IP address, an Address Resolution Protocol request is initiated requesting for the MAC address associated with a target IP address (e.g. 192.168.1.90) of the newly added network-compatible device 140D.

In step 350, the error in the home network is detected based on the Address Resolution Protocol reply.

In an embodiment, detecting the error based on the Address Resolution Protocol reply comprises verifying that there is no response for the Address Resolution Protocol request. MAC address 00-08-AB-CD-EF-64 is not present in the MAC address allow list of the home gateway. Hence, the Address Resolution Protocol request is not processed and there is no response. This implies that MAC address filtering is enabled in the home network and the newly added network-compatible device 140D is non-functional.

To overcome the detected error, a new MAC address to be associated with the newly added network-compatible device 140D is generated. The newly generated MAC address is registered in the MAC address allow list of the home gateway. This allows the newly added network-compatible device 140D to be connected to the Internet and enables proper functioning of the newly added network-compatible device 140D.

In a further embodiment, detecting the error based on the Address Resolution Protocol reply comprises verifying that there is a response for the Address Resolution Protocol request and checking whether the newly added network-compatible device 140D is non-functional and if so initiating a customer service request call to report non-functioning of the newly added network-compatible device and providing information to the customer service center that filtering based on MAC addresses is disabled in the home network.

MAC address 00-08-AB-CD-EF-64 is not present in the MAC address allow list of the home network. Even though the MAC address 00-08-AB-CD-EF-64 is not present in the MAC address allow list of the home network, Address Resolution Protocol is able to return the MAC address of the newly added network-compatible device which implies that filtering of MAC address feature is disabled in the home network.

Further, if the newly connected network-compatible device 140D is non-functional, then a service request call is initiated. The information can help in fixing the error and enabling proper functioning of the newly added network-compatible device. This can further help in speedy closure of customer support calls. This can also be of further help in understanding the source of the error thereby reducing the risk of drawing incorrect conclusions e.g. the customer may conclude that there is an error with the newly purchased network-compatible device even though the source of the error is in the home gateway.

Figure 4:
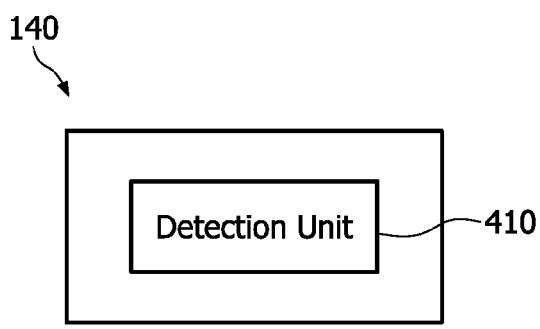
FIG. 4 schematically shows the network-compatible device having an error detection unit according to an embodiment of the present subject matter.

A detection unit 410 can be provided in network-compatible devices 140A, 140B, 140C and 140D as shown in FIG. 4. The detection unit 410 can be configured to detect the error in the home network while the network-compatible device 140D is added to the home network as disclosed in the embodiments.

The disclosed solution generates a new MAC address that is not present in the MAC address allow list of the home network and checks whether the Address Resolution Protocol request is able to respond for the new MAC address. If there is a reply then conclusion is drawn that filtering based on MAC address is disabled in the home network. If there is no reply then conclusion is drawn that filtering based on MAC address is enabled in the home network. Based on whether filtering of MAC feature is enabled or disabled, appropriate corrective action can be taken to fix up the detected error and enable the newly added network-compatible device to be operational.

In summary, a method for detecting an error in a home network while a network-compatible device is newly added to the home network, the home network having a modem configured to be connected to the Internet, a home gateway connected between the modem and the home network, the method for detecting the error comprising employing address resolution protocol and detecting the error in the home network due to filtering based on MAC addresses is disclosed.

The disclosed subject matter can be used for diagnosis of problems in the home network that can arise due to filtering based on Media Access Control addresses by the home gateway. It can also be used for speedy closure of customer support calls related to network connected products whose proper functioning is impeded by filtering based on Media Access Control addresses in the home gateway. This can also be used to solve field call rates of network connected products. The disclosed method can help the user better understand the source of the problem in the home network when a network-compatible device is being added to the home network.

While the subject matter has been illustrated in detail in the drawings and foregoing description, such illustration and description are to be considered illustrative or exemplary and not restrictive; the subject matter is not limited to the disclosed embodiments. Other variations to the disclosed embodiments can be understood and effected by those skilled in the art of practicing the claimed subject matter, from a study of the drawings, the disclosure and the appended claims. Use of the verb "comprise" and its conjugates does not exclude the presence of elements other than those stated in a claim or in the description. Use of the indefinite article "a" or "an" preceding an element or step does not exclude the presence of a plurality of such elements or steps. A single unit may fulfill the functions of several items recited in the claims. The mere fact that certain measures are recited in mutually different dependant claims does not indicate that a combination of these measures cannot be used to advantage. The figures and description are to be regarded as illustrative only and do not limit the subject matter. Any reference sign in the claims should not be construed as limiting the scope.

The invention claimed is:

1. A method for detecting an error in a home network while a network-compatible device is added to the home network, the method comprising:
   finding an IP address of a home gateway;
   requesting a MAC address associated with the IP address of the home gateway;
   modifying the home gateway MAC address to generate a new MAC address;
   initiating an address resolution protocol request using the new MAC address; and
   detecting an error in the home network due to filtering based on MAC addresses.

2. The method of claim 1, further comprising:
   initiating the address resolution protocol request using one or both of a MAC address and a first IP address of a network-compatible device in the home network as a sender MAC address and a sender IP address and requesting the MAC address associated with the IP address of the home gateway; and
   modifying the received MAC address of the home gateway in a pre-determined manner to generate the new MAC address.

3. The method of claim 2, wherein modifying the received MAC address of the home gateway comprises:
   either incrementing or decrementing by a pre-determined constant value a least significant byte of the received MAC address.

4. The method of claim 2, further comprising:
   initiating an address resolution protocol request using the new MAC address and a second IP address of the network-compatible device as a new sender MAC address and a new sender IP address;
   requesting a MAC address associated with a target IP address of the added network-compatible device; and
   detecting the error in the home network based on the address resolution protocol reply.

5. The method of claim 4, wherein detecting the error in the home network based on the address resolution protocol reply comprises:
   verifying that there is no response for the address resolution protocol request; and
   notifying that filtering based on MAC addresses is enabled in the home network.

6. The method of claim 5, further comprising:
   generating a new MAC address to be associated with the added network-compatible device and registering the new generated MAC address into the MAC address allow list of the home gateway to enable proper functioning of the added network-compatible device.

7. The method of claim 4, wherein detecting the error in the home network based on the address resolution protocol reply comprises:
   verifying that there is a response for the address resolution protocol request.

8. The method of claim 5, further comprising:
   checking whether the added network-compatible device is non-functional and if so initiating a customer service request call to report non-functioning of the added network-compatible device and providing information to the customer service center that filtering based on MAC addresses is disabled in the home network.

9. The method of claim 2, further comprising:
   finding an IP address of the network-compatible device;
   requesting a MAC address associated with the network-compatible device;
   modifying the requested MAC address in a predetermined manner to generate a new MAC address;
   initiating the address resolution protocol request using the new MAC address; and
   detecting an error in the home network based on the address resolution protocol reply.

10. A system for detecting an error in a home network while a network-compatible device is added to the home network, the system comprising:
    a modem configured to connect to an external network;
    a home network comprising one or more network-compatible devices; and
    a home gateway connected between the modem and the home network, the home gateway configured to provide MAC address filtering and to couple the home network to the external network via the modem; and
    at least one of the home gateway and one of the one or more network-compatible devices configured to:
      find an IP address of either the home gateway or one of the one or more network-compatible devices;
      request a MAC address associated with the found IP address;
      perform a modification of the requested MAC address in a pre-determined manner to generate a new MAC address;
      initiate an address resolution protocol request using the new MAC address and a second IP address of either the home gateway or one of the one or more network-compatible devices as a new sender MAC address and a new sender IP address;
      request a MAC address associated with a target IP address of the added network-compatible device; and
      detect an error in the home network based on the address resolution protocol reply.

11. The system of claim 10, wherein one of the one or more network-compatible devices is configured to:
    find an IP address of the home gateway;
    request a MAC address associated with the IP address of the home gateway;
    perform a modification of the requested MAC address in a pre-determined manner to generate a new MAC address;
    initiate an address resolution protocol request using the new MAC address and a second IP address of either the home gateway or the one of the one or more network-compatible devices as a new sender MAC address and a new sender IP address;
    request a MAC address associated with a target IP address of the added network-compatible device; and
    detect an error in the home network based on the address resolution protocol reply.

12. The system of claim 11, wherein the one of the one or more network-compatible devices comprises a host computer.

13. The system of claim 10, wherein at least one of the home gateway and the one or more network-compatible devices is further configured to:
    either increment or decrement a least significant byte of the received MAC address by a pre-determined constant value.

14. The system of claim 10, wherein at least one of the home gateway and the one or more network-compatible devices is further configured to:
    detection the error in the home network based on the address resolution protocol reply comprises:
      verification that there is no response for the address resolution protocol request.

15. A computer program product, comprising a non-transitory computer usable medium having a computer readable program instructions embodied therein, the computer readable program instructions executable by one or more network-compatible devices comprising a home network that when executed cause the one or more network-compatible devices to:
- find an IP address of a home gateway;
- request a MAC address associated with the IP address of the home gateway;
- perform a modification of the home gateway MAC address in a pre-determined manner to generate a new MAC address;
- initiate an address resolution protocol request using the new MAC address; and
- detect an error in the home network due to filtering based on MAC addresses.

16. The computer program product of claim 15, further comprising:
- computer readable program instructions that when executed cause the home gateway to:
  - find an IP address of one of the one or more network-compatible devices;
  - request a MAC address associated with found IP address;
  - modify the requested MAC address in a predetermined manner to generate a new MAC address;
  - initiate the address resolution protocol request using the new MAC address; and
  - detect an error in the home network based on the address resolution protocol reply.

17. The computer program product of claim 16, further comprising:
- computer readable program instructions that when executed cause either the home gateway or one of the one or more network-compatible devices to:
  - either increment or decrement a least significant byte of the received MAC address by a pre-determined constant value.

18. The computer program product of claim 15, wherein at least one of the one or more network-compatible devices comprises a host computer adapted to execute the computer readable program instructions thereon.

* * * * *